US012806569B2

(12) United States Patent
Kim et al.

(10) Patent No.: US 12,806,569 B2
(45) Date of Patent: Nov. 24, 2026

(54) REGENERATIVE CATALYTIC APPARATUS FOR PFCS AND HEAT STORAGE BODIES

(71) Applicants: CORE TECH CO., LTD., Anseong-si (KR); SAMSUNG ELECTRONICS CO., LTD., Suwon-si (KR)

(72) Inventors: Dooboem Kim, Suwon-si (KR); Jong San Kim, Anseong-si (KR); Young Hwan Moon, Anseong-si (KR); Deungki Yun, Suwon-si (KR); Eun Seo Park, Anseong-si (KR); Jun Min Yeom, Anseong-si (KR); Heon Jung, Anseong-si (KR); Sungwon Hong, Suwon-si (KR)

(73) Assignees: CORE TECH CO., LTD., Anseong-si (KR); SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 18/243,931

(22) Filed: Sep. 8, 2023

(65) Prior Publication Data

US 2024/0082785 A1 Mar. 14, 2024

(30) Foreign Application Priority Data

Sep. 8, 2022 (KR) ........................ 10-2022-0114206

(51) Int. Cl.
*B01D 53/86* (2006.01)
*C04B 35/10* (2006.01)
(Continued)

(52) U.S. Cl.
CPC .......... *B01D 53/8668* (2013.01); *C04B 35/10* (2013.01); *C04B 35/62222* (2013.01);
(Continued)

(58) Field of Classification Search
CPC .... B01D 53/86; B01D 53/005; B01D 53/343; B01D 53/75; B01D 53/77; B01D 53/8662; B01D 53/8668; C04B 35/10; C04B 35/01
See application file for complete search history.

(56) References Cited

U.S. PATENT DOCUMENTS 7,294,315 B1 11/2007 Kanno et al.
8,691,361 B2 4/2014 Okazaki et al.
(Continued)

FOREIGN PATENT DOCUMENTS

EP 1 205 234 A1 5/2002
JP 2018-58726 A 4/2018
(Continued)

OTHER PUBLICATIONS

Communication issued Aug. 7, 2025 by the Korean Intellectual Property Office in counterpart Korean Patent Application No. 10-2022-0114206.

*Primary Examiner* — Sharon Pregler
(74) *Attorney, Agent, or Firm* — Sughrue Mion, PLLC

(57) ABSTRACT

A heat storage body for a regenerative catalytic apparatus is provided, the heat storage body includes: a body unit including a ceramic sintered body containing aluminum oxide, silica, and magnesium oxide, the body unit having a plurality of channels connecting first and second surfaces, located opposite to each other. The heat storage body further including a protective film disposed on a surface of the body unit and inner surfaces of the plurality of channels. The protective film includes an oxide containing a first metal of aluminum and at least one second metal including at least one from among yttrium, zinc, zirconium, tungsten, and nickel.

10 Claims, 8 Drawing Sheets

(51) Int. Cl.
*C04B 35/622* (2006.01)
*C04B 35/64* (2006.01)

(52) U.S. Cl.
CPC .......... *C04B 35/64* (2013.01); *B01D 2257/70* (2013.01); *C04B 2235/3217* (2013.01); *C04B 2235/3225* (2013.01); *C04B 2235/9607* (2013.01)

(56) References Cited

U.S. PATENT DOCUMENTS

2006/0192324 A1* 8/2006 Kaneda ............. C04B 35/62635 264/630
2012/0208142 A1* 8/2012 Zhou ....................... F28F 13/18 432/214
2022/0010426 A1* 1/2022 Waldfried ............... B32B 18/00

FOREIGN PATENT DOCUMENTS

| | | | |
|---|---|---|---|
| JP | 6549344 | B1 | 7/2019 |
| KR | 10-2005-0116381 | A | 12/2005 |
| KR | 10-0766749 | B1 | 10/2007 |
| KR | 10-2011-0048506 | A | 5/2011 |
| KR | 10-1263569 | B1 | 5/2013 |
| KR | 10-2017-0071903 | A | 6/2017 |
| KR | 10-1939609 | B1 | 1/2019 |
| KR | 10-2021-0136249 | A | 11/2021 |

* cited by examiner

REGENERATIVE CATALYTIC APPARATUS FOR PFCS AND HEAT STORAGE BODIES

CROSS-REFERENCE TO THE RELATED APPLICATION

This application claims priority and benefit of Korean Patent Application No. 10-2022-0114206, filed on Sep. 8, 2022, in the Korean Intellectual Property Office, the disclosure of which is incorporated herein by reference in its entirety.

BACKGROUND

1. Field

Embodiments of the present disclosure relate to a harmful gas processing apparatus, and more particularly, to a regenerative catalytic apparatus for a perfluorinated compound (PFC) gas, and a heat storage body used therein and a method for manufacturing the heat storage body.

2. Description of Related Art

Perfluorinated compound (PFCs) gas is a representative greenhouse gas, and regulation of emission of PFC gas is gradually being strengthened in industrial facilities. Since PFC gas is a non-decomposable material that decomposes at high temperatures, it has recently been treated by a thermal decomposition method using a catalyst. This decomposition treatment may be performed by a regenerative catalytic system (RCS).

However, by-products such as hydrofluoric acid (HF) are generated during a decomposition process of PFC gas in the regenerative catalytic system, and these by-products corrode equipment components such as a heat storage body, or the like, and in severe cases, a serious structure problem such as collapse of loaded heat storage bodies may occur.

SUMMARY

According to embodiments of the present disclosure, a heat storage body, for a regenerative catalytic system having corrosion resistance to by-products generated in a PFC decomposition process, and a method for manufacturing the same are provided.

According to embodiments of the present disclosure, a regenerative catalytic system having a heat storage body having corrosion resistance to by-products generated in a PFC decomposition process is provided.

According to embodiment of the present disclosure, a heat storage body for a regenerative catalytic apparatus is provided. The heat storage body includes a body unit including: a first surface; a second surface opposite to the first surface; and a ceramic sintered body including aluminum oxide, silica, and magnesium oxide, and further including a plurality of channels extending from the first surface to the second surface. The heat storage body further includes a protective film disposed on a surface of the body unit, and including an oxide containing: a first metal of aluminum; and at least one second metal selected from a group consisting of yttrium, zinc, zirconium, tungsten, and nickel.

According to embodiment of the present disclosure, a regenerative catalytic apparatus for a PFC gas is provided. The regenerative catalytic apparatus includes: a reactor including an internal space configured to decompose and treat the PFC gas; a catalyst material layer in the reactor, the catalyst material layer configured to promoting decomposition of the PFC gas; a heater configured to supply heat to the reactor so that the PFC gas is thermally decomposed using the catalyst material layer; and at least one heat storage body installed at an inlet and an outlet of the reactor and configured to accumulate the heat. Each of the at least one heat storage body includes: a body unit including a ceramic sintered body that comprises a plurality of channels, the plurality of channels configured as a movement path for the PFC gas and thermally-decomposed by-product gas, and a protective film on inner surfaces of the plurality of channels and a surface of the body unit. The protective film includes an oxide containing: a first metal of aluminum; and at least one second metal selected from a group consisting of yttrium, zinc, zirconium, tungsten, and nickel.

According to embodiment of the present disclosure, a method of manufacturing a heat storage body for a regenerative catalytic apparatus is provided. The method includes forming a ceramic molded body, the ceramic molded body including a first surface, a second surface located opposite to the first surface, and a plurality of channels extending from the first surface to the second surface. The method further includes: preparing a coating solution in which a first metal of aluminum and at least one second metal selected from a group consisting of yttrium, zinc, zirconium, tungsten, and nickel are mixed; dipping the ceramic molded body in the coating solution; drying the dipped ceramic molded body; and forming a ceramic sintered body by sintering the ceramic molded body at a temperature of 900 to 1500° C.

BRIEF DESCRIPTION OF DRAWINGS

The above and other aspects, features, and advantages of embodiments of the present disclosure will be more clearly understood from the following detailed description taken in conjunction with the accompanying drawings, in which.

DETAILED DESCRIPTION

Figure 1:
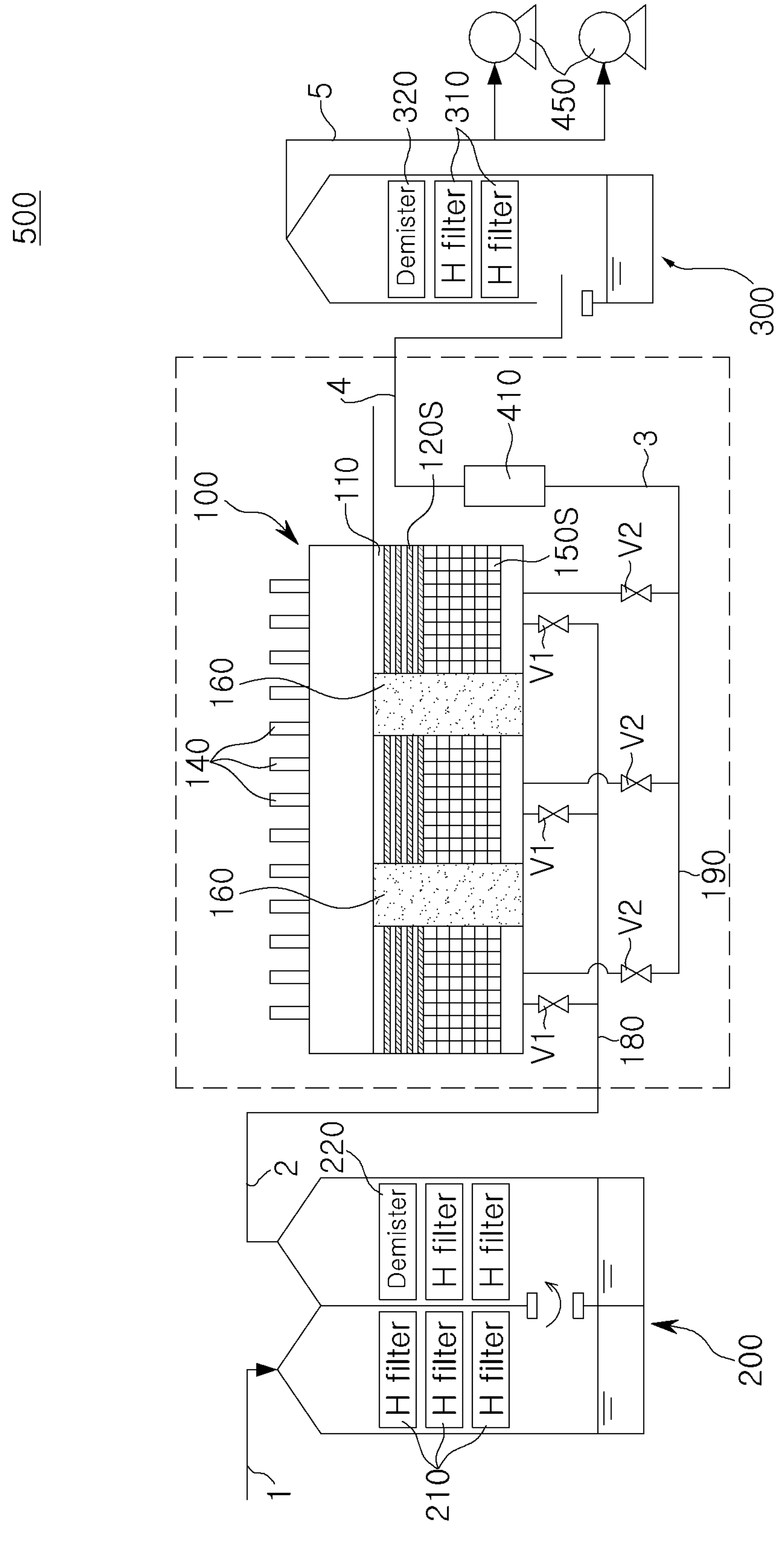
FIG. 1 is a schematic diagram of a regenerative catalytic system for a perfluorinated compound (PFC) gas according to an example embodiment of the present disclosure.

Hereinafter, non-limiting example embodiments of the present disclosure will be described with reference to the accompanying drawings. Hereinafter, terms such as "an upper side," "an upper portion," "an upper surface," "a lower side," "a lower portion," "a lower surface," and the like, may be understood as referring to the drawings, except where otherwise indicated by reference numerals.

It will be understood that when an element or layer is referred to as being "on," "connected to," or "coupled to" another element or layer, it can be directly on, connected to, or coupled to the other element or layer or intervening elements or layers may be present. In contrast, when an element or layer is referred to as being "directly on," "directly connected to," or "directly coupled to" another element or layer, there are no intervening elements or layers present.

Figure 2:
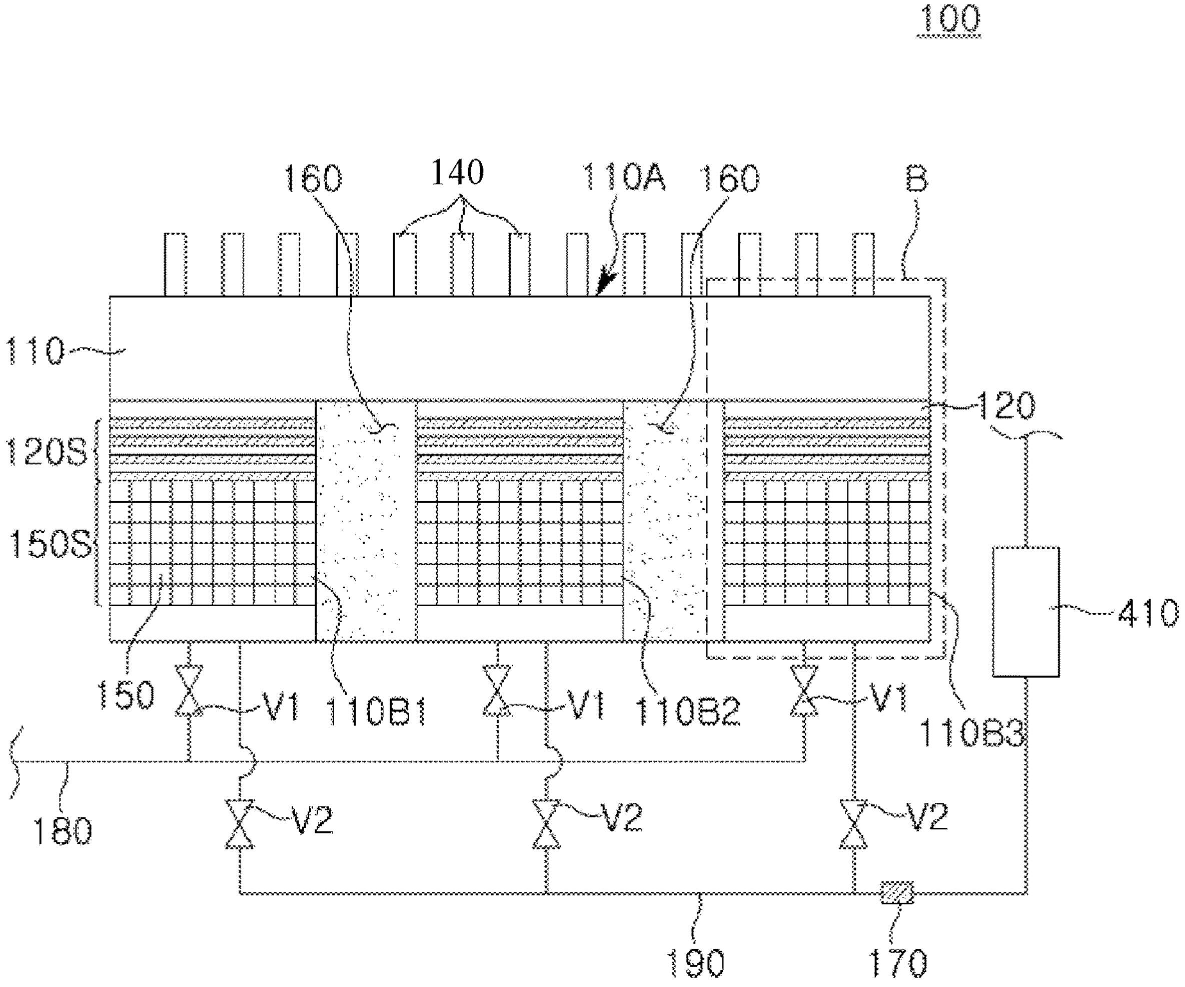
FIG. 2 is an enlarged view illustrating a regenerative catalytic apparatus of the regenerative catalytic system illustrated in FIG. 1.

FIG. 1 is a schematic diagram of a regenerative catalytic system for a perfluorinated compound (PFC) gas according to an example embodiment of the present disclosure, and FIG. 2 is an enlarged view illustrating a regenerative catalytic apparatus for perfluorinated compound (PFC) gas of the regenerative catalytic system illustrated in FIG. 1.

Referring to FIG. 1, a regenerative catalytic system 500 for perfluorinated compound (PFC) gas according to an example embodiment of the present disclosure may include a regenerative catalytic apparatus 100 for decomposing and treating a gas, a first wet scrubber 200 disposed in front of the regenerative catalytic apparatus 100 to pre-treat the gas, and a second wet scrubber 300 disposed at a rear end of the catalytic regeneration apparatus 100 to post-treat the gas.

The gas to be treated includes greenhouse gases such as perfluorinated compound (PFCs) gases. For example, the perfluorinated compound gases include CF4, C2F6, and C3F8, and are widely used in the semiconductor industry. In particular, since CF4 is decomposed at a high temperature of 1200° C. or higher, it is difficult to decompose, so it may be decomposed by a Regenerative Catalyst Oxidation (RCO) method. The regenerative catalytic apparatus 100 employed in this embodiment may be understood as a Regeneration Thermal Oxidation (RTO) apparatus using a catalytic material so that it can be decomposed (or oxidized) at a lower temperature than the existing temperature. In this specification, the regenerative catalytic apparatus 100 may also referred to as an "RTO apparatus" or a "RCO apparatus."

The first wet scrubber 200 may perform pre-treatment to block harmful substances (e.g., HF, dust), that adversely affect the regenerative catalytic apparatus 100, from exhaust gas emitted from production facilities such as semiconductor process facilities (refer to path 1 to path 2). Similarly thereto, a second wet scrubber 300 is configured to perform post-treatment of the HF emitted from the regenerative catalytic apparatus 100 (refer to path 4 to path 5). In this embodiment, the first wet scrubber 200 and the second wet scrubber 300 may include filters 210 and 310 for filtering HF and demisters 220 and 320 for filtering dust and mist, respectively.

The regenerative catalytic apparatus 100 may be configured to thermally decompose harmful gases such as supplied PFC gas (see FIG. 2). For example, CF4 can be thermally decomposed as shown below in Equation 1.

$$CF4 + 2H2O \longrightarrow 4HF + CO2 \quad \text{(Equation 1)}$$

In this thermal decomposition process, by-products such as HF may be produced. Since these by-products may lead to corrosion of equipment, wet scrubbing may be introduced to treat by-products such as HF.

The regenerative catalytic apparatus 100 employed in this embodiment may include a reactor 110 for decomposing and treating perfluorinated compound (PFC) gas, a catalyst material layer 120 (refer to FIG. 2) disposed in the reactor 110 and configured to promote decomposition of perfluorinated compound gas, a heating unit (e.g., a heater) 140 configured to supply heat into the reactor 110 so that the perfluorinated compound gas is thermally decomposed using the catalyst material layer 120, and at least one heat storage body 150 (refer to FIG. 2) installed at an inlet and outlet of the reactor 110 and configured to accumulate heat.

Referring to FIG. 2, the reactor 110 employed in this embodiment may include a lower structure 110B (refer to FIG. 3) comprised of lower spaces 110B1, 110B2, and 110B3, and a gas to be treated, and an upper structure 110A respectively communicating with the lower spaces to provide one reaction space. The plurality of lower spaces employed in this embodiment may include, for example, first to third lower spaces 110B1, 110B2, and 110B3 partitioned by two partition wall structures 160, but example embodiments of the present disclosure are not limited thereto. In some example embodiments, the plurality of lower spaces may be formed as separate structures without a partition wall structure. In some other embodiments, the reactor 110 may be provided as one space as in the upper structure 110A in a state in which the lower structure of the reactor 110 in which the heat storage body 150 and the catalyst material layer 120 are disposed is not separated.

The reactor 110, particularly the upper structure 110A of the reactor 110, may include the heater unit 140. The heater unit 140 may thermally decompose harmful gases such as PFC gas supplied to an inner space of the reactor 110 by heating the same. As described above, since PFC gas, such as CF4, requires a high thermal decomposition temperature (e.g., 1200° C.), the regenerative catalytic apparatus 100 according to the present embodiment may include a catalyst material layer 120 to implement thermal decomposition at a relatively low temperature.

As illustrated in FIGS. 1 and 2, the catalyst material layer 120 may be disposed in a gas movement path in the reactor 110 to ensure efficient treatment of the PFC gas at a relatively low temperature. For example, thermal decomposition of PFC gas (e.g., CF4) can be efficiently performed at a relatively low temperature of 700° C. to 800° C. by introducing the catalyst material layer 120. In this embodiment, the catalyst material layer 120 may be provided in a structure 120S in which a plurality of the catalyst material layers 120 are stacked, and the structure 120S of the catalyst material layer 120 may be disposed in the first to third lower spaces 110B1, 110B2, and 110B3 provided at an inlet/outlet of the reactor 110.

In addition, for efficient treatment of PFC gas, the catalyst material layer 120 and the heater unit 140 may be disposed to face each other. In this disposition, reaction efficiency may be improved by increasing a contact time of the PFC gas with the catalyst material layer 120 in a space heated to a high temperature.

The catalyst material layer 120 may include a catalytic material for decomposing and treating PFC gas. For example, the catalytic material may be a material in which at least one from among tungsten (W) and nickel (Ni) is a main component, and at least one from among Al and Si is additionally mixed. Consumption of the catalyst material layer 120 may be confirmed using a sensor (not shown) that senses a concentration of HF gas in the exhaust gas emitted from the reactor 110.

A heat storage body 150 (refer to FIG. 2) for accumulating heat may be disposed below the catalyst material layer 120. The heat storage body 150 may serve to maintain a temperature in the reactor 110 and lower a temperature of the exhaust gas that is thermally decomposed. As described above, the heat storage body 150 may be disposed in a gas movement path in the reactor 110. In this embodiment, a plurality of a heat storage body stacks 150S may be provided, in which a plurality of the heat storage bodies 150 are stacked, and the plurality of the heat storage body stacks 150S may be respectively disposed below the catalyst material layer 120 in the first to third lower spaces 110B1, 110B2, and 110B3 provided at an inlet and outlet of the reactor 110.

As described above, the heat storage body 150 and the catalyst material layer 120 may be separately disposed in each of the lower spaces 110B1, 110B2, and 110B3. In this embodiment, a replacement time of the heat storage body 150 and the catalyst material layer 120 disposed in each of the lower spaces 110B1, 110B2, and 110B3, in consideration of a lifespan and size of the heat storage body 150 and the catalyst material layer 120 may vary.

Referring to FIGS. 1-2, the regenerative catalytic apparatus 100 according to the present embodiment may be connected to the first wet scrubber 200 by a first pipe 180, and connected to the second wet scrubber 300 by a second pipe 190.

The PFC gas to be treated is injected into the reactor 110 through the first pipe 180, passes through the heat storage body 150 and the catalyst material layer 120 and is decomposed and treated in an inner space of the reactor 110 heated by the heater unit 140, and the treated gas may be then discharged through the second pipe 190. The injection path of the PFC gas may be determined by selection of first valves V1, and similarly thereto, the discharge path of the PFC gas may be determined by selection of second valves V2.

While the PFC gas is being decomposed and treated, when a temperature of the exhaust gas drops to a desired set temperature (e.g., 100° C. to 200° C.) by the heat storage body 150, at least one of the second valves V2 may be opened to discharge the exhaust gas. In consideration of the state of the heat storage body 150 and the like, the first valves V1 and the second valves V2 may be selectively adjusted to change the gas flow path, thereby effectively lowering a temperature of the exhaust gas. The operation of the first valves V1 and the second valves V2 for changing the path may be performed according to the temperature of the exhaust gas. The temperature of the exhaust gas may be measured and determined by a temperature sensor 170 installed in the second pipe 190.

The regenerative catalytic system 500 for perfluorinated compound (PFC) gas may further include a control unit (not shown) for controlling the heater unit 140 to maintain an internal temperature of the reactor 110 at a set level, together with opening and closing operations of the first valves V1 and the second valves V2 described above. The control unit may include a memory loaded with a control program for controlling the regenerative catalytic system 500 (including the regenerative catalytic apparatus 100) and at least one processor (e.g., a microprocessor) configured to execute the control program. The control program, when executed by the at least one processor, may be configured to cause control of one or more (some or all) components of the regenerative catalytic system 500 to perform their respective functions, including the functions described in the present disclosure.

In this embodiment, the temperature inside the reactor 110 may be controlled by the control unit to be maintained in a range of 700 to 800° C., particularly 730° C. to 760° C. When a temperature of the treated exhaust gas emitted from the second pipe 190 through the catalyst material layer 120 and the heat storage body 150 for decomposing and treating the PFC gas is high, damage to the second wet scrubber 300 installed at the rear end of the regenerative catalytic apparatus 100 or a risk of fire may occur. In order to solve this potential problem, a cooling device 410 may be provided. The cooling device 410 may be provided to prevent damage and fire by being configured to cool the exhaust gas, which may include the decomposed and treated PFC gas, while the exhaust gas moves to the second wet scrubber 300 at a rear end of the regenerative catalytic apparatus 100. In addition, a blowing fan or a pump 450 may be installed at the rear end of the second wet scrubber 300 to facilitate exhaust gas discharge (see FIG. 1).

Referring to FIG. 1, the gas emitted from the regenerative catalytic apparatus 100 may need to be lowered to an appropriate temperature. Since the exhaust gas is lowered to an appropriate temperature, the PFC gas can be decomposed and treated with high energy efficiency without generating condensate during the PFC gas treatment process due to vaporization in a path 3. For example, an appropriate temperature of the gas emitted from the regenerative catalytic apparatus 100 may be controlled to be in a range of 100° C. to 200° C. When the temperature of the gas is not maintained to this range, and supercooled, condensate containing HF may be generated (see FIG. 3).

In addition, referring to the paths 1 and 2, a temperature of gas passing through a pre-treatment process of the first wet scrubber 200 may be maintained at almost room temperature. In a path 3, after the RCO treatment is performed, a gas temperature may be maintained between 100° C. and 200° C. Referring to path 4, the exhaust gas may pass through the cooling device 410. And in a path 5, gas may be maintained at a temperature between 50° C. and 70° C.

Figure 3:
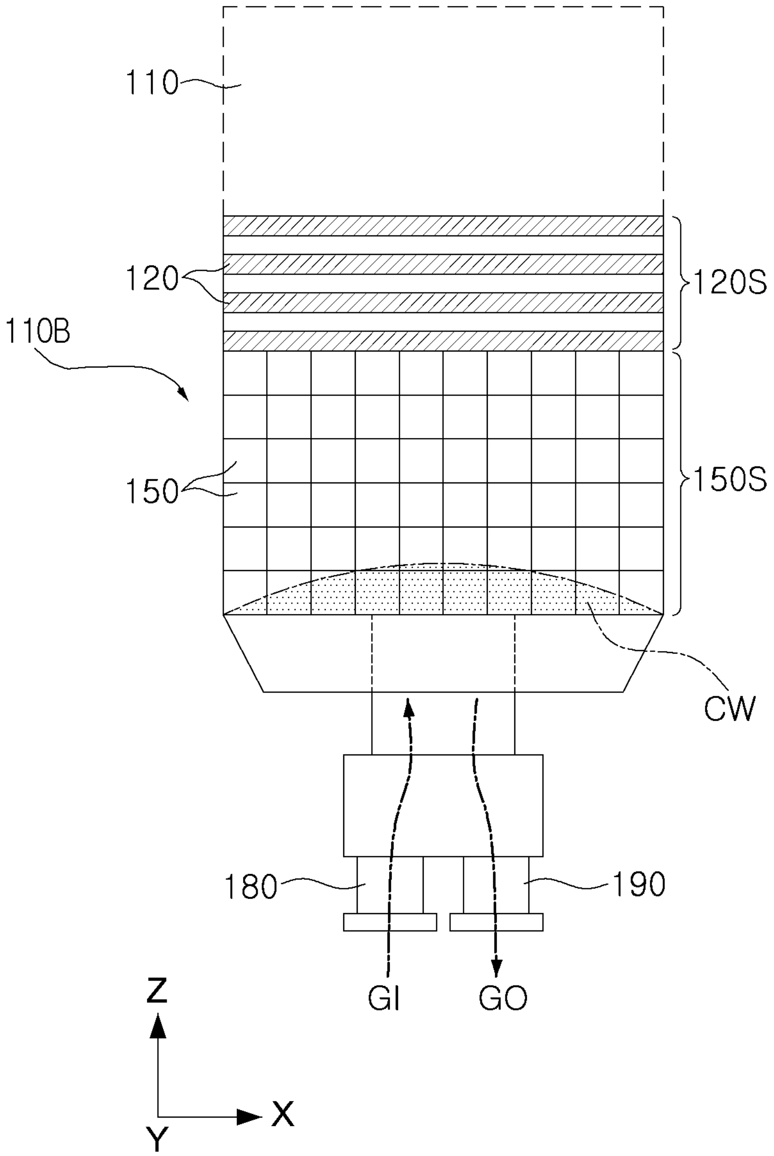
FIG. 3 is a schematic cross-sectional view illustrating a detailed configuration of the regenerative catalytic apparatus illustrated in FIG. 2.
Figure 4:
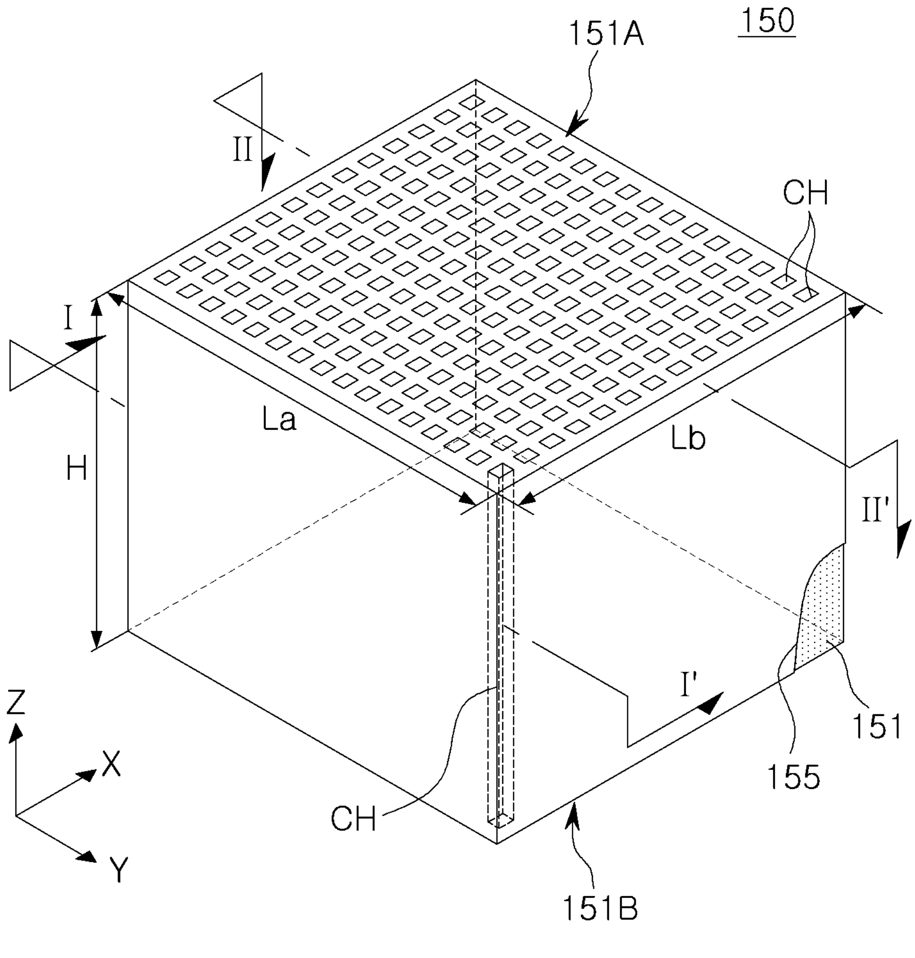
FIG. 4 is a schematic perspective view illustrating a heat storage body for a regenerative catalytic apparatus according to an example embodiment of the present disclosure.

FIG. 3 is a schematic cross-sectional view illustrating a detailed configuration of the regenerative catalytic apparatus illustrated in FIG. 2, and FIG. 4 is a schematic perspective view illustrating a heat storage body that may be employed in the regenerative catalytic apparatus of FIG. 3.

Referring to FIG. 3 together with FIG. 4, a plurality of heat storage bodies 150 may be stacked in a lower structure 110B of the reactor 110 as described above. In addition, each of the heat storage bodies 150 has a plurality of channels CH connecting a first surface 151A (upper surface) and a second surface 151B (lower surface), and in a structure 120S, in which a plurality of the catalyst material layers 120 are stacked, the plurality of heat storage bodies 150 may be arranged such that each of the channels CH is arranged in a Z direction (e.g., a vertical direction).

Referring to FIG. 3, gas to be treated is introduced into a reactor through a first pipe GI, reacts with the catalyst material layer 120 in the heater unit 140 installed above the reactor 110, and PFC gas is treated in a set temperature range, and the treated gas may pass through the heat storage body 150 (in particular, the channels CH) and be exhausted to a second pipe GO. Heat of the gas treated in this discharge process may be accumulated in the heat storage body 150 and lowered to a preset temperature (e.g., 100° C. to 200° C.).

In a process of treating the PFC gas, condensate CW containing HF may be generated at a lower end of the heat storage body stack 150S of the heat storage bodies 150. Specifically, when a temperature of the exhaust gas after treatment is lowered, condensate CW containing HF as a by-product may be generated, and this condensate CW may flow back into the regenerative catalytic apparatus 100. In addition, even at a low concentration, it may be introduced from the first wet scrubber 200 together with the gas to be treated.

Since the condensate CW contains HF, it may corrode the heat storage body 150, which is a ceramic sintered body, and is exposed by the condensate CW especially with hot air, so a degree of corrosion becomes serious, and may even cause a problem in which the heat storage body stack 150S of the heat storage bodies 150 collapses. Therefore, after a certain period of time has elapsed, it should be replaced at a point in time at which physical strength of the heat storage body 150 is reduced.

In the heat storage body 150 according to the present embodiment, a protective film 155 may be added to a surface of a body unit 151, which is a ceramic sintered body of the heat storage body 150, to enhance acid resistance.

Figure 5A:
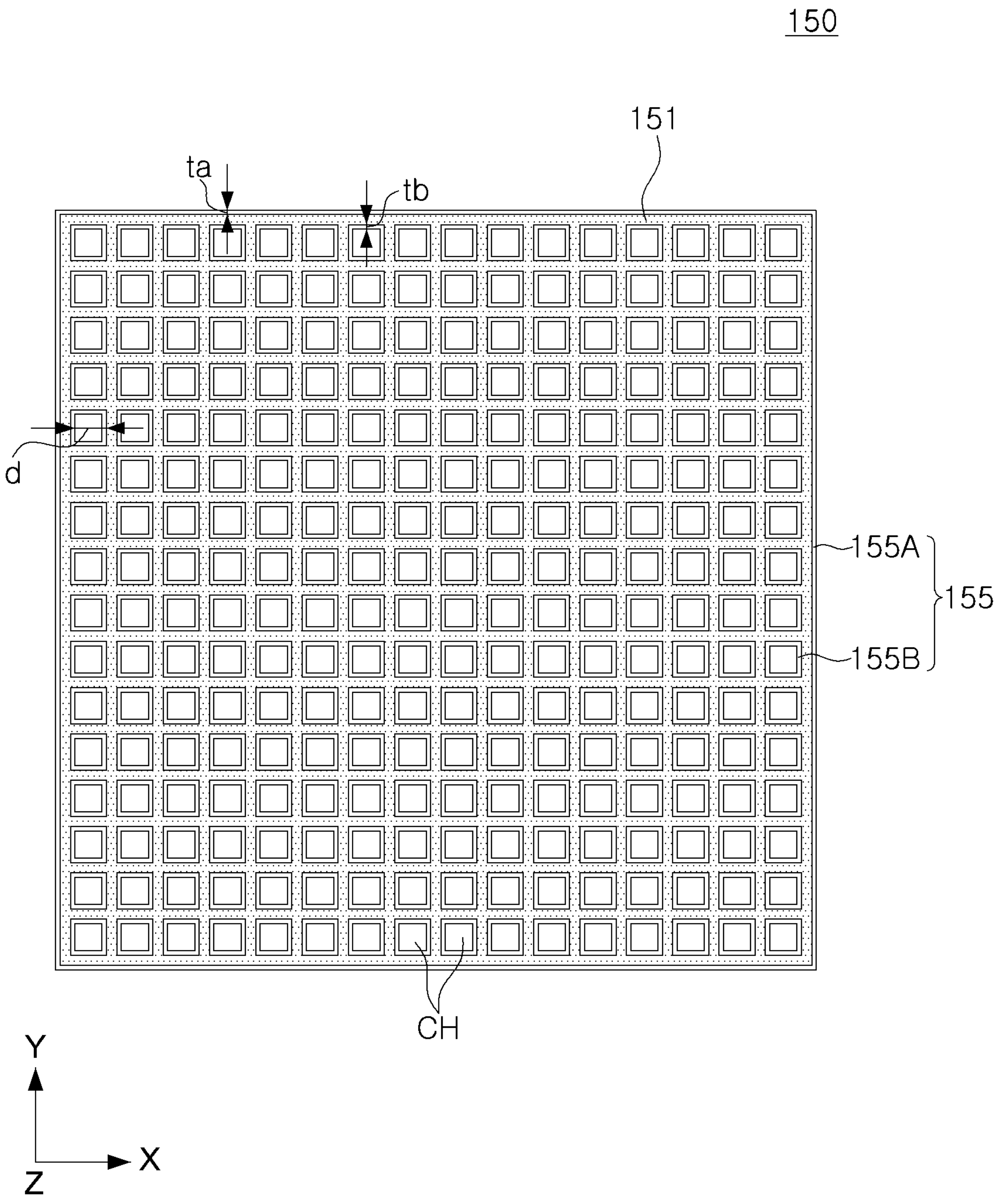
FIG. 5A is a cross-sectional view of the heat storage body illustrated in FIG. 4 taken along line I-I'.
Figure 5B:
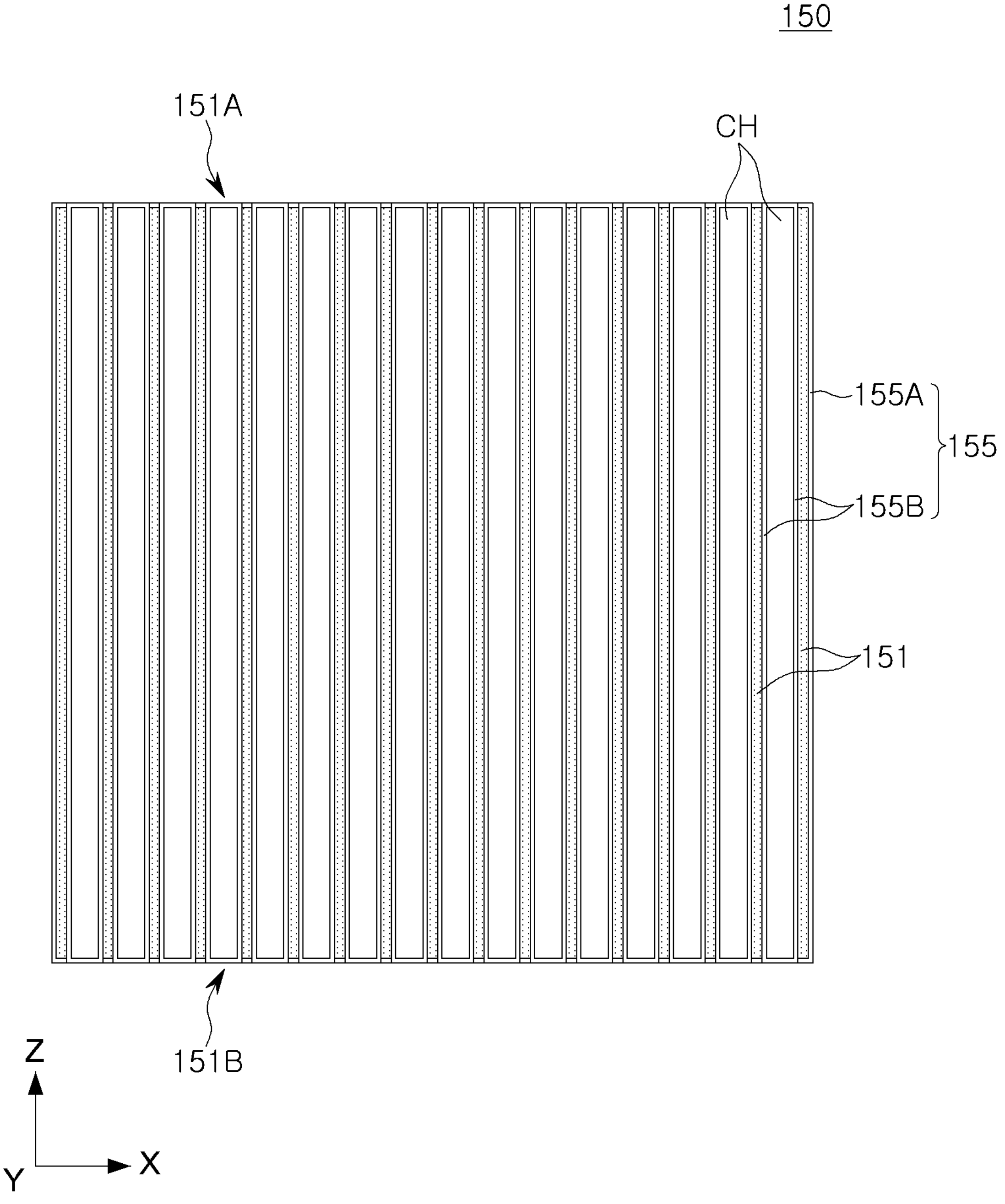
FIG. 5B is a cross-sectional view of the heat storage body illustrated in FIG. 4 taken along line II-II'.

FIG. 4 is a schematic perspective view illustrating a heat storage body for a regenerative catalytic apparatus according to an example embodiment of the present disclosure, and FIGS. 5A and 5B are cross-sectional views of the heat storage body illustrated in FIG. 4 taken along lines I-I' and II-II', respectively.

Referring to FIGS. 4, 5A, and 5B, the heat storage body 150 for the regenerative catalytic apparatus according to the present embodiment may include the body unit 151 having the plurality of channels CH connecting the first surface 151A and the second surface 151B located opposite to each other, and the protective film 155 disposed on a surface of the body unit 151.

In the protective film 155, an inner surface of the plurality of channels CH may be formed on the surface of the body unit 151 (see FIGS. 5A and 5B). In FIG. 4, for convenience of description, the protective film 155 of some corners of the heat storage body 150 is illustrated in a state of being removed, but the protective film 155 may be formed substantially over the entire surface.

The body unit 151 employed in this embodiment may have a honeycomb structure having a plurality of channels CH. The plurality of channels CH may have a path through which gas to be treated is introduced and a path through which the treated exhaust gas is exhausted. Each of the X-Y cross sections of the plurality of channels CH may have a rectangular shape, but an example embodiment thereof is not limited thereto. For example, the plurality of channels CH may be compactly arranged at 30 to 50 per unit square inch. Each of the channels may be formed to have a width (d) to secure a flow path of gas.

The body unit 151 may be a ceramic sintered body containing aluminum oxide. In some embodiments, the ceramic sintered body may include aluminum oxide, silica, and magnesium oxide. For example, the ceramic sintered body may include 25 wt % to 40 wt % of aluminum oxide, 40 wt % to 60 wt % of silica, and 10 wt % to 24 wt % of magnesium oxide. In a specific embodiment, the ceramic sintered body may include 2MgO·2Al2O3·5SiO2 having cordierite crystals.

The body unit 151 may have a hexahedral structure. FIG. 4 illustrates the body unit 151 as have a cube structure having the same horizontal and vertical lengths (La and Lb) and a height (H), but embodiments of the present disclosure are not limited thereto. For example, the horizontal and vertical lengths La and Lb may be in a range of 100 mm to 200 mm, respectively. In some example embodiments, the body unit 151 may have a cuboid or columnar structure. In the case of a pillar structure, the plurality of channels CH may be formed in a height direction to connect the upper and lower surfaces.

The protective film 155 employed in this embodiment may include a combination of acid-resistant metals to protect the ceramic sintered body, which is the body unit 151, from condensate such as HF. As illustrated in FIGS. 5A and 5B, the protective film 155 may be formed not only on an outer surface of the body unit 151 but also on inner surfaces provided by the plurality of channels CH. In the protective film 155, a thickness ta of a portion located on the outer surface and a thickness tb of a portion located on the inner surface thereof may have a similar thickness tb. For example, the thicknesses ta and tb of the protective film 155 may be in a range of 5 μm to 500 μm. In some example embodiments, the thicknesses ta and tb of the protective film 155 may be in a range of 10 μm to 50 μm. In some example embodiments, the protective film 155 may include an oxide containing a first metal of aluminum and at least one second metal selected from a group consisting of yttrium, zinc, zirconium, tungsten, zine, and nickel.

In some example embodiments, the protective film 155 may include an oxide containing yttrium and aluminum. In the protective film 155, yttrium may be contained in a range of 25% to 100% relative to a weight of aluminum. In the protective film 155, yttrium may be contained in a range of 30% to 80% relative to the weight of aluminum (see [Acid resistance test 2] discussed further below).

In some example embodiments, the protective film 155 may include an oxide containing nickel and aluminum (see [Acid resistance test 2] discussed further below).

In some example embodiments, the protective film 155 may include an oxide containing zinc, zirconium, tungsten, and aluminum. In the protective film 155, zinc, zirconium, and tungsten may be contained in ranges of 0.1% to 10%, 0.1% to 10%, and 0.1% to 5%, respectively, based on a weight of aluminum (see [Acid Resistance Test 1] discussed further below).

Figure 6:
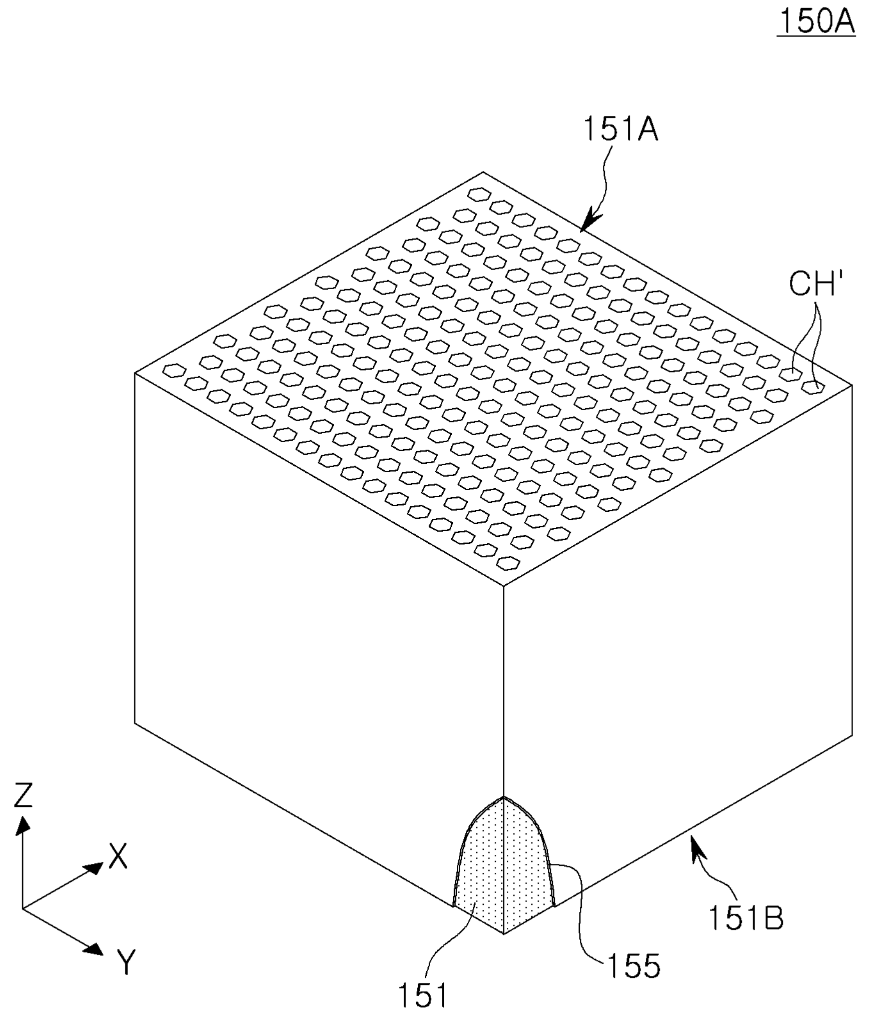
FIG. 6 is a schematic perspective view illustrating a heat storage body for a regenerative catalytic apparatus according to an example embodiment of the present disclosure.

FIG. 6 is a schematic perspective view illustrating a heat storage body for a regenerative catalytic apparatus according to an example embodiment of the present disclosure.

Referring to FIG. 6, it can be understood that a heat storage body 150A for a regenerative catalytic apparatus is similar to the heat storage body 150 illustrated in FIGS. 4, 5A, and 5B, except that a cross-sectional shape and arrangement of channels are different. In addition, components of this embodiment may be understood with reference to descriptions of the same or similar components of the heat storage body 150 illustrated in FIGS. 4, 5A, and 5B unless otherwise stated.

Similar to the previous embodiment, the heat storage body 150A for a regenerative catalytic apparatus according to the present embodiment may include a body unit 151 having a plurality of channels CH' connecting a first surface 151A and a second surface 151B, located opposite to each other, and a protective film 155 disposed on a surface of the body unit 151. The protective film 155 may be formed on inner surfaces of the plurality of channels CH' and a surface of the body unit 151. Each of X-Y cross-sections of the plurality of channels CH' may have a hexagonal shape, and may be arranged in a hexagonal dense structure in a zigzag manner. However, embodiments of the present disclosure are not limited thereto, and the cross-sectional shapes of the plurality of channels CH' may be other polygonal or circular shapes.

Figure 7:
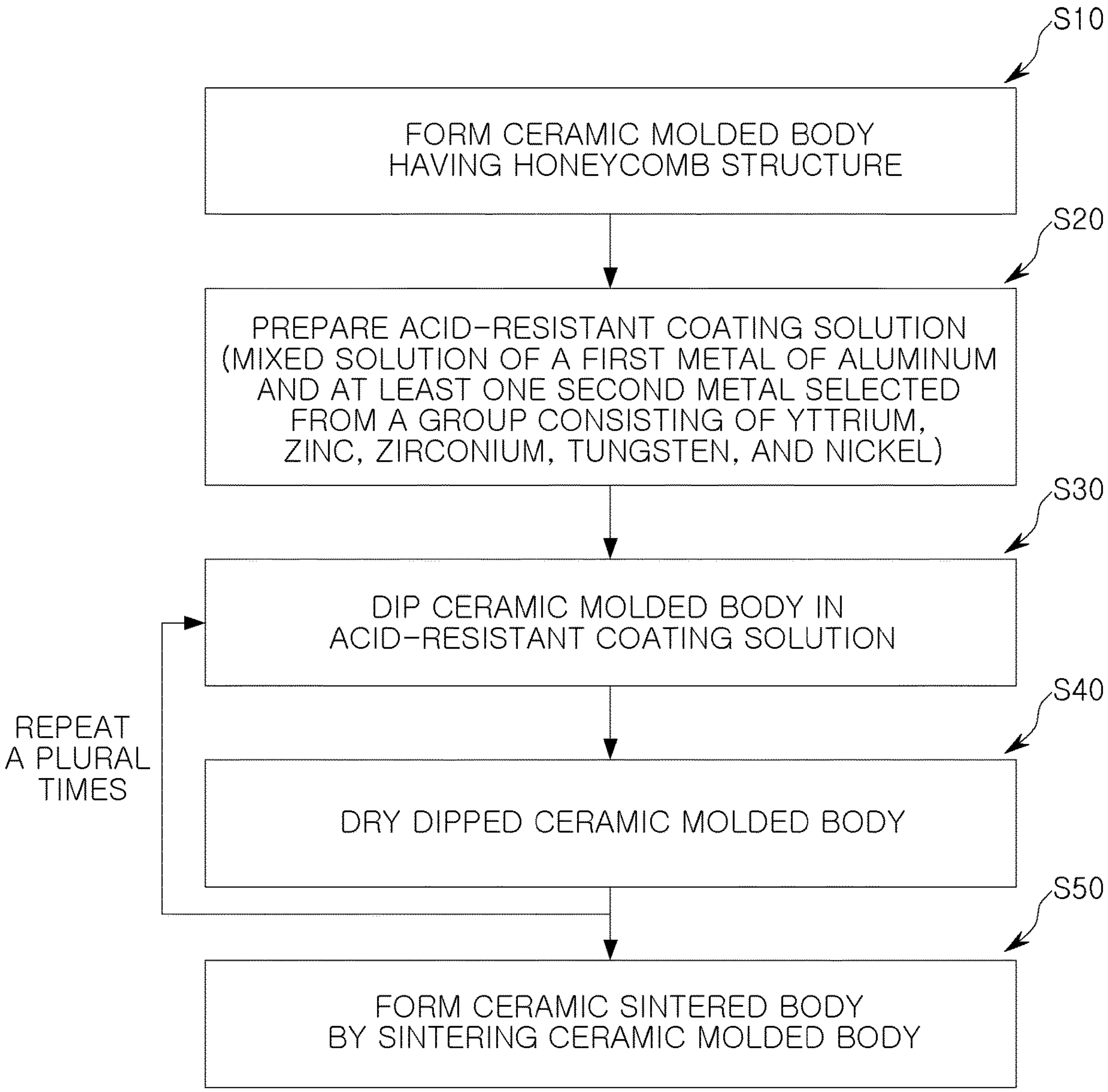
FIG. 7 is a process flow chart illustrating a method of manufacturing a heat storage body for a regenerative catalytic apparatus according to an example embodiment of the present disclosure.

FIG. 7 is a process flow chart illustrating a method of manufacturing a heat storage body for a regenerative catalytic apparatus according to an example embodiment of the present disclosure.

Referring to FIG. 7, a method for manufacturing a heat storage body according to the present embodiment may start with forming a ceramic molded body having a honeycomb structure (step S10).

As described with reference to FIG. 4, the ceramic molded body having a honeycomb structure may have a plurality of channels connecting first and second surfaces located opposite to each other. The ceramic molded body may include at least aluminum oxide. In some example embodiments, the ceramic sintered body may include aluminum oxide, silica, and magnesium oxide. For example, the ceramic sintered body may include 25 wt % to 40 wt % of aluminum oxide, 40 wt % to 60 wt % of silica, and 10 wt % to 24 wt % of magnesium oxide. In a specific embodiment, the ceramic sintered body may include $2MgO \cdot 2Al2O3 \cdot 5SiO2$ having cordierite crystals.

Subsequently, in a step S20, a coating solution containing metal is prepared to enhance acid resistance.

The metal for enhancing acid resistance may include a first metal of aluminum and at least one second metal selected from a group consisting of yttrium, zinc, zirconium, tungsten, and nickel. In a process of preparing the coating solution, a first solution is prepared by dispersing alumina hydrate in water, and then a second solution in which a compound of the second metal is dissolved is prepared. A coating solution containing an acid-resistant metal may be prepared by mixing the first solution and the second solution.

Next, in a step S30, the ceramic molded body is dipped in the coating solution, and then, in a step S40, the dipped ceramic molded body is dried.

The dipped ceramic molded body may be placed in a constant temperature and humidity chamber and dried at a temperature of 100° C. or higher. The drying process may be performed step by step through a plurality of drying processes. For example, the ceramic molded body may be primarily dried at a temperature in a range of 100° C. to 150° C., and the ceramic molded body may be secondarily dried at a temperature in a range of 200° C. to 300° C.

By repeating the dipping/drying steps (step S30 and step S40) a plurality of times, a protective film having a thickness that guarantees a desired level of acid resistance may be formed. For example, the dipping/drying step may be repeated two to ten times. In some example embodiments, a step of drying the ceramic molded body immediately after the dipping step of the last order may be omitted, and a step of sintering the ceramic molded body (step S50) may be performed.

A ceramic sintered body may be formed by sintering the dipped/dried ceramic molded body at a temperature of 900 to 1500° C. During the sintering process, an acid-resistant coating layer formed on a surface of the ceramic molded body during the dipping/drying process may be sintered to form a protective film.

As described above, the ceramic sintered body may be provided as a body unit of the heat storage body, and a protective film, sintered together, may be provided as an acid-resistant protective film. The ceramic sintered body, which is the body unit 151, may be protected from condensate such as HF by the protective film.

This protective film may be a composite metal oxide film. For example, the protective film may include an oxide containing a first metal of aluminum, and at least one second metal selected from a group consisting of yttrium, zinc, zirconium, tungsten, and nickel. For example, the thickness of the protective film may have a range of 5 μm to 500 μm, and more preferably having a range of 10 μm to 50 μm.

Hereinafter, causes and effects of embodiments of the present disclosure will be described in detail with reference to specific example embodiments of the present disclosure.

Example 1A

A ceramic molded body was manufactured using a ceramic mixture of aluminum oxide, silica, and magnesium oxide The ceramic molded body has a cube shape having a length of one side of 50 mm×50 mm×50 mm (a size of a final ceramic sintered body may be slightly changed depending on process errors), and a sample of the ceramic molded body having a honeycomb structure having a plurality of channels penetrating through both surfaces, located opposite to each other was manufactured. Here, each of the plurality of channels has a rectangular shape, and may be disposed to have about 40 channels per square inch.

Subsequently, a two-component solution in which aluminum and yttrium are mixed was prepared as a coating solution to enhance acid resistance of a final heat storage body.

Specifically, as an aluminum source, a first solution was prepared by dispersing pseudoboehmite ($\gamma$-$Al2O3 \cdot nH2O$), which is an aluminum hydrate, in water, and a second solution was prepared by dissolving yttrium carbonate in nitric acid. Subsequently, a coating solution for enhancing acid resistance is prepared by mixing a first solution comprising aluminum and a second solution comprising yttrium so that a weight ratio of aluminum and yttrium is 2:1.

After the sample of the ceramic molded body was (primary) dipped in the coating solution, a solution coated on a surface of the sample of the ceramic molded body was dried in a constant temperature and humidity chamber. The drying process may be performed by primary drying at 110° C. and then secondary drying at 400° C. The primary and secondary drying were performed for 2 hours each.

Next, after the same (secondary) dipping process and the same (secondary) drying process were additionally performed once, an additional (tertiary) dipping process was performed again, and the tertiary dipped sample of the ceramic molded body was directly sintered at 1000° C. to prepare a heat storage body sample having an acid-resistant protective film (Example 1A).

Example 1B

A heat storage body sample having an acid-resistant protective film (Example 1B) was prepared in the same manner as in Example 1A, but a protective layer was formed on a surface of the heat storage body sample using a coating solution having a different mixing ratio of yttrium to aluminum. Specifically, the coating solution was prepared by mixing the first solution and the second solution so that the weight ratio of aluminum and yttrium was 2:2.

In the same manner as in Example 1A, a heat storage body sample having an acid-resistant protective film (Example 1B) was prepared by sintering after the dipping and drying processes.

Example 2

A heat storage body sample having an acid-resistant protective film (Example 2) was prepared in the same manner as in Example 1A, but a protective layer was formed on a surface of a heat storage body sample using a different type of acid-resistant coating solution.

As a coating solution for enhancing acid resistance, a four-component solution in which aluminum, zinc, zirconium, and tungsten are mixed was prepared, and in the same manner as in Example 1A, after the dipping and drying processes, sintering was performed to prepare a heat storage body sample (Example 2) having an acid-resistant protective film.

Comparative Example

In the same manner as in Example 1, a ceramic molded body was prepared and then sintered to prepare a heat storage body sample (Comparative Example), but a coating solution was not applied to the ceramic molded body.

[Acid Resistance Test 1]

Three heat storage bodies having a protective layer, prepared according to Examples 1A, 1B, and 2, and a heat storage body without a protective layer, prepared according to Comparative Example, were dipped in a sample of 10% HF solution for one week, and a breakage rate of the heat storage bodies was evaluated. Before the acid resistance test, a length of one side of the heat storage body was measured, and after the acid resistance test, a length of unbroken side of the heat storage body was measured in a region where the greatest breakage occurred, and a breakage rate was defined as a percentage of the length of the broken region to the length before the acid resistance test.

As a result, as shown in Table 1 below, the breakage rates of the three heat storage bodies according to Examples 1A, 1B, and 2, and one heat storage body according to Comparative Example were measured.

TABLE 1

| Sample | Length of one side before test (mm) | Length of one side after test (mm) | Breakage rate (%) |
|---|---|---|---|
| Example 1A | 52.85 | 51.75 | 2.12 |
| Example 1B | 54.76 | 51.73 | 5.85 |
| Example 2 | 56.78 | 51.75 | 8.86 |
| Comparative Example (Bare) | 53.06 | 45.53 | 14.2 |

It can be confirmed that a breakage rate of the heat storage body sample according to Examples 1A, 1B, and 2 is greatly improved compared to a breakage rate of the heat storage body sample of the Comparative Example without an acid-resistant protective layer. In particular, in terms of acid resistance, it can be confirmed that acid resistance to HF is enhanced by 2 to 4 times in Examples 1A and 1B employing an oxide film containing aluminum and yttrium as a protective film, compared to Example 2 having a four-component complex oxide film as a protective film.

Example 1C

A heat storage body sample having an acid-resistant protective film (Example 1C) was prepared in the same manner as in Example 1A, but a protective layer was formed on a surface of the heat storage body sample using a coating solution having a different mixing ratio of yttrium to aluminum. Specifically, a coating solution was prepared by mixing the first solution and the second solution so that a weight ratio of aluminum and yttrium was 2:0.5.

In the same manner as in Example 1A, a heat storage body sample having an acid-resistant protective film (Example 1C) was prepared by sintering the same after the dipping and drying processes.

Example 3A

A heat storage body sample having an acid-resistant protective film (Example 3A) was prepared in the same manner as in Example 1A, but a protective layer was formed on a surface of the heat storage body sample using a different type of acid-resistant coating solution.

As a coating solution for enhancing acid resistance, a two-component solution in which aluminum and nickel are mixed was prepared. Specifically, as an aluminum source, a first solution was prepared by dispersing pseudoboehmite, an aluminum hydrate, in water, and a second solution was prepared by dissolving nickel hydroxide in nitric acid. Subsequently, a coating solution for enhancing acid resistance is prepared by mixing a first solution containing aluminum and a second solution containing yttrium so that a weight ratio of aluminum and nickel was 2:1.

In the same manner as in Example 1A, a heat storage body sample having an acid-resistant protective film (Example 3A) was prepared by sintering after the dipping and drying processes.

Example 3B

A heat storage body sample having an acid-resistant protective film (Example 3B) was prepared in the same manner as in Example 3A, but a protective layer was formed on a surface of the heat storage body sample using a coating solution having a different mixing ratio of nickel to aluminum. Specifically, a coating solution was prepared by mixing the first solution and the second solution so that a weight ratio of aluminum and nickel was 2:2.

In the same manner as in Example 3A, a heat storage body sample having an acid-resistant protective film (Example 3B) was prepared by sintering after the dipping and drying processes.

Example 3C

A heat storage body sample having an acid-resistant protective film (Example 3C) was prepared in the same manner as in Example 3A, but a protective layer was formed on a surface of the heat storage body sample using a coating solution having a different mixing ratio of nickel to aluminum. Specifically, a coating solution was prepared by mixing the first solution and the second solution so that a weight ratio of aluminum and nickel was 2:0.5.

In the same manner as in Example 3A, a heat storage body sample having an acid-resistant protective film (Example 3C) was prepared by sintering the same after the dipping and drying processes.

[Acid Resistance Test 2]

An acid resistance test was performed on heat storage body samples under conditions more stringent than those of the previous acid resistance test 1 (e.g., HF 25% solution).

Specifically, six heat storage bodies having a protective layer, prepared according to Examples 1A-1C and 3A-C, and a heat storage body without a protective layer applied prepared according to Comparative Example were dipped in a sample of HF 25% solution for 1 week, and a breakage rate of the heat storage bodies were evaluated.

The evaluation of the breakage rate was calculated in the same manner as in [Acid resistance test 1]. As a result, as shown below in Table 2 below, the breakage rate of the six heat storage bodies according to Examples 1A-1C and 3A-C and one heat storage body according to the Comparative Example was measured.

TABLE 2

| Sample | Breakage rate (%) |
|---|---|
| Example 1A (Al:Y = 2:1) | 17.8% |
| Example 1B (Al:Y = 2:2) | 32.8% |
| Example 1C (Al:Y = 2:0.5) | 43.4% |
| Example 3A (Al:Ni = 2:1) | 44.0% |
| Example 3B (Al:Ni = 2:2) | 41.7% |
| Example 3C (Al:Y = 2:0.5) | 52.1% |
| Comparative Example (Bare) | 66.9% |

In general, compared to [Acid resistance test 1], because [Acid resistance test 2] has a reinforced condition, a breakage rate was high. Even from the results of this experiment, it can be confirmed that a breakage rate of a heat storage body sample according to Examples 1A-1C and 3A-C is greatly improved as compared to a high breakage rate of a heat storage body sample without an acid-resistant protective layer according to the Comparative Example. In particular, in terms of acid resistance, in examples in which an oxide film containing aluminum and yttrium was used as a protective film, a breakage rate in which an oxide film containing aluminum and yttrium was used as a protective film was generally higher than an oxide film containing aluminum and nickel was used as a protective film.

Referring to Examples 3A to 3C employing an oxide film containing aluminum and nickel as a protective film, the higher the nickel content ratio, the higher the acid resistance, but, referring to Examples 1A to 1C employing an oxide film containing aluminum and yttrium as a protective film, when a weight ratio of yttrium to aluminum is 50%, it exhibited the lowest breakage rate (Example 1A).

In particular, in the case of the protective film according to Examples 1A to 1C, an acid resistance effect is large when a weight ratio of yttrium to aluminum is in a range of 25% to 100%, and further, a great improvement effect may be expected in a range of 30% to 80%.

As set forth above, according embodiments of the present disclosure, a heat storage body used in a regenerative catalytic apparatus for greenhouse gases may have a protective film containing acid-resistant metals formed on a surface of a ceramic body.

Such a protective film may prevent corrosion of a heat storage body by condensate containing HF, thereby improving the performance and life of the heat storage body, and at the same time preventing structural collapse of a stack of the heat storage body.

While non-limiting example embodiments of the present disclosure have been shown and described above, it will be apparent to those skilled in the art that modifications and variations can be made without departing from the scope of the present disclosure.

What is claimed is:

1. A heat storage body for a regenerative catalytic apparatus, the heat storage body comprising:
a body unit comprising:
a first surface;
a second surface opposite to the first surface; and
a ceramic sintered body comprising aluminum oxide, silica, and magnesium oxide, and further comprising a plurality of channels extending from the first surface to the second surface; and
a protective film disposed on a surface of the body unit, and comprising an oxide containing:
a first metal of aluminum; and
at least one second metal comprising:
zinc, zirconium, and tungsten; or
nickel.

2. A heat storage body for a regenerative catalytic apparatus, the heat storage body comprising:
a body unit comprising:
a first surface;
a second surface opposite to the first surface; and
a ceramic sintered body comprising aluminum oxide, silica, and magnesium oxide, and further comprising a plurality of channels extending from the first surface to the second surface; and
a protective film disposed on a surface of the body unit, and comprising an oxide containing:
a first metal of aluminum; and
at least one second metal comprising yttrium,
wherein in the protective film, a weight of the yttrium that is contained is in a range of 25% to 100% relative to a weight of the aluminum.

3. The heat storage body of claim 2, wherein in the protective film, the weight of the yttrium that is contained in a range of 30% to 80% relative to the weight of the aluminum.

4. The heat storage body of claim 1, wherein the at least one second metal of the oxide of the protective film comprises zinc, zirconium, and tungsten.

5. The heat storage body of claim 4, wherein in the protective film, weights of the zinc, the zirconium, and the tungsten are contained in a range of 0.1% to 10%, 0.1% to 10%, and 0.1% to 5%, respectively, relative to a weight of the aluminum.

6. The heat storage body of claim 1, wherein the at least one second metal of the oxide of the protective film comprises nickel.

7. The heat storage body of claim 1, wherein the protective film has a thickness in a range of 5 μm to 500 μm.

8. The heat storage body of claim 1, wherein the ceramic sintered body comprises 25 wt % to 40 wt % of aluminum oxide, 40 wt % to 60 wt % of silica, and 10 wt % to 24 wt % of magnesium oxide.

9. The heat storage body of claim 1, wherein the ceramic sintered body comprises $2MgO·2Al_2O_3·5SiO_2$ having cordierite crystals.

10. The heat storage body of claim 1, wherein the body unit has a hexahedral structure, and
a cross-section of the plurality of channels is rectangular, circular, or hexagonal.

* * * * *